United States Patent
Zellner et al.

(10) Patent No.: US 7,065,061 B1
(45) Date of Patent: *Jun. 20, 2006

(54) SYSTEM AND METHOD FOR PROVIDING DATA SERVICES USING IDLE CELL RESOURCES

(75) Inventors: Samuel N. Zellner, Dunwoody, GA (US); Mark Enzmann, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 09/922,042

(22) Filed: Aug. 3, 2001

Related U.S. Application Data

(63) Continuation of application No. 09/579,000, filed on May 25, 2000, now abandoned, which is a continuation of application No. 08/903,534, filed on Jul. 30, 1997, now Pat. No. 6,069,882.

(51) Int. Cl.
 *H04J 3/08* (2006.01)
 *H04Q 7/00* (2006.01)
 *H04B 7/212* (2006.01)
 *H04B 7/00* (2006.01)

(52) U.S. Cl. .................... 370/329; 370/326; 370/348; 455/509; 455/517

(58) Field of Classification Search ............... 370/329, 370/347, 348, 326, 337, 345, 310, 280, 236, 370/256; 455/509, 517, 439, 450, 331
See application file for complete search history.

(56) References Cited

U.S. PATENT DOCUMENTS

| | | | | |
|---|---|---|---|---|
| 4,803,679 A | * | 2/1989 | Shimizu | 455/528 |
| 5,157,709 A | * | 10/1992 | Ohteru | 455/465 |
| 5,457,735 A | * | 10/1995 | Erickson | 379/58 |
| 5,513,242 A | | 4/1996 | Mukerjee et al. | |
| 5,521,925 A | | 5/1996 | Merakos et al. | 370/95.3 |
| 5,539,923 A | * | 7/1996 | Matsumoto | 455/33.4 |
| 5,570,411 A | * | 10/1996 | Sicher | 455/450 |
| 5,574,977 A | | 11/1996 | Joseph et al. | |

(Continued)

FOREIGN PATENT DOCUMENTS

WO   WO 97/16040   5/1997

OTHER PUBLICATIONS

International Search Report issued by the European Patent Office in PCT/US98/15568, in the name of BellSouth Corporation, mailed Jan. 21, 1999.

*Primary Examiner*—Man Phan
(74) *Attorney, Agent, or Firm*—Merchant & Gould

(57) ABSTRACT

Providing data services using idle cell capacity in a cellular communications system. The system and method assign priorities to each remote user device in the cellular communications system. In response to a request for service for a remote user device, the mobile switch determines whether an idle channel is available for the remote user device. If no idle channel is available, the mobile switch determines whether a remote use device with a lower priority than the requesting remote user device is using a channel. If a lower priority remote use is using a channel, its call is terminated and the channel is assigned to the requesting remote user device. If no lower priority remote user device is using a channel, the request for service is put into an ordered queue to wait for the next available idle channel.

44 Claims, 4 Drawing Sheets

U.S. PATENT DOCUMENTS

| | | | |
|---|---|---|---|
| 5,583,869 A | * 12/1996 | Grube et al. | 370/347 |
| 5,678,179 A | * 10/1997 | Turcotte et al. | 455/331 |
| 5,708,968 A | * 1/1998 | Suzuki | 455/34.1 |
| 5,729,541 A | * 3/1998 | Hamalainen et al. | 370/337 |
| 5,732,073 A | 3/1998 | Kusaki et al. | |
| 5,742,588 A | * 4/1998 | Thornberg et al. | 370/236 |
| 5,787,358 A | * 7/1998 | Takahashi | 455/512 |
| 5,832,384 A | * 11/1998 | Balachandran et al. | 455/450 |
| 5,867,790 A | * 2/1999 | Hamada | 455/115 |
| 5,914,945 A | 6/1999 | Abu-Amara et al. | |
| 5,926,469 A | 7/1999 | Norstedt et al. | |
| 5,930,239 A | * 7/1999 | Turcotte | 370/310 |
| 6,009,331 A | * 12/1999 | Ueda | 455/450 |
| 6,026,289 A | * 2/2000 | Zellner et al. | 455/403 |
| 6,069,882 A | * 5/2000 | Zellner et al. | 370/329 |
| 6,101,389 A | * 8/2000 | Koizumi et al. | 455/450 |
| 6,201,966 B1 | * 3/2001 | Rinne et al. | 455/434 |
| 6,470,024 B1 | * 10/2002 | Hamalainen et al. | 370/459 |

* cited by examiner

SYSTEM AND METHOD FOR PROVIDING DATA SERVICES USING IDLE CELL RESOURCES

This application is a continuation of U.S. application Ser. No. 09/579,000, entitled "System and Method for Providing Data Services Using Idle Cell Resources," filed May 25, 2000, now abandoned; which is a continuation of U.S. application Ser. No. 08/903,534, entitled "System and Method for Providing Data Services Using Idle Cell Resources," filed Jul. 30, 1997, issued as U.S. Pat. No. 6,069,882; which are incorporated herein by reference.

FIELD OF THE INVENTION

This invention relates in general to a switched communications system and more particularly to a method for transmitting data using idle communications system resources.

BACKGROUND OF THE INVENTION

Circuit switched networks, such as cellular communications systems, generally offer only one class of service which is used primarily for voice calls. In a cellular communications system, voice calls compete with data calls for the same limited number of channels available in a particular cell or access point to the network. Service providers therefore cannot justify pricing data calls differently than voice calls, and as a result, cellular communications systems have not been extensively utilized as data networks.

Some service providers have sought to overcome the problem of single class service by deploying separate facilities to handle data calls on a reduced rate basis. Separate data facilities in a cellular communications system still can only reduce the cost of data calls to the extent that the capital investment for such facilities is lower than the cellular communications systems used for voice calls. Consequently, in existing cellular communications systems, the demand for voice call service sets the price that a carrier will rationally charge for competing data call service.

SUMMARY OF THE INVENTION

The present invention offers multi-level service in a wireless cellular communications system, as well as in a wired switched communications network, by providing a system and method for utilizing idle channels of an existing cellular communications system for transmission of data. By offering multi-levels of service on idle channels, the service provider can rationally price data call service below the pricing level of voice call service while at the same time increasing the utilization of the cellular communications system.

Particularly, the system and method of the present invention are predicated on the fact that many data transmission applications are not particularly time sensitive. By contrast, voice calls are time sensitive and require immediate connection and continuity of connection. A delay in sending e-mail for a few minutes or even a few hours does not substantially reduce the user's perceived value of the data transmission service. Likewise, an interruption in sending e-mail will not substantially reduce the perceived value of the service. Therefore, data calls, unlike voice calls, can wait on the availability of an idle channel. By utilizing idle channels for data transmission, the service provider can rationally price data calls less than the higher priority voice calls. The use of idle channel capacity for data calls at a lower price also assures greater usage of the cellular communications system.

In order to utilize idle channels for data transmission, the system and method of the present invention assigns a priority to each remote user device. The priority of each remote user device is part of the profile and authorization information for each remote user. The priority is associated with the mobile identification Number (MIN) for each remote user. The profile and authorization information including the priority is maintained in a database (home location register (HLR)) in the mobile switch. The mobile switch controls the cellular communications system and provides the computer intelligence for the present invention.

When a call request is received at the mobile switch for service either from a remote user or to a remote user (first remote user), the mobile switch first checks the profile and authorization information of the first remote user stored in the database HLR and determines the remote user's priority. The mobile switch then ascertains if a channel in the cell (or cell sector) where the first remote user device is located has an idle channel. If an idle channel is available the call to or from the first remote user device is connected immediately without regard to the priority of the first remote user device.

If, however, no idle channel is available for connection of the call to or from the first remote user device, the mobile switch searches the cell for a channel that is being used by a remote user device with a priority that is lower than the priority of the first remote user device. If no lower priority remote user device is found on an active channel, the call request for the first remote user device may be placed in a priority ordered queue of other remote users to await the availability of an idle channel. When the remote user is placed in the ordered queue, the mobile switch notifies the remote user that it has been placed in the queue so that the remote user will not continue requesting service while the remote user's request for service is in the queue. When a channel becomes available the remote user at the head of the ordered queue is then connected. Whether or not a remote user is place in the queue depends on a number of factors including the profile and authorization information in the HLR for the remote user, whether the call is inbound or outbound, and how inbound data was handled by the mobile switch. If the remote user has not registered to be queued or if queuing would tie up other resources, its call request will be ended when it can not be quickly connected.

If, however, a lower priority remote user device (second remote user) is found in the cell (or cell sector), the mobile switch will terminate the call for the second remote user device and connect the call for the first remote user device on the vacated channel. If more than one lower priority remote user device is found in the cell and if both lower priority users have the same priority, the lower priority user with the longest call duration will be terminated in favor of the call request for the first remote user device.

At termination of the call of the second remote user in favor of the first remote user, the data transmission software of the second remote user recognizes the termination and stores parameters that allow the data transmission of the second remote user to resume at the point in the transmission where termination occurred. Once the call of the second remote user device has been terminated, a request to resume the call for the second remote user device may be placed in the priority ordered queue to await the availability of an idle channel. When the second remote user is placed in the ordered queue, the mobile switch notifies the second remote user so that the second remote user will not try to reestablish the connection until its call request reaches the head of the ordered queue. Notifying the second remote user of the call termination and queuing also gives the second remote user the opportunity to shutdown its transmission of data in an orderly fashion, When the terminated call of the second remote user reaches the head of the ordered queue and when an idle channel becomes available, the call is resumed at the point where it was terminated.

When the call request to the first remote user originates from the public switched communications network and is for data transmission to the first remote user, the mobile switch retrieves the profile and authorization information for the first remote user from the HLR. If the first remote user is a high priority data user with time sensitive data (such as video data associated with a video conference call), the request will be connected based on its priority, and the connection will be maintained for the duration of the call.

If the first remote user, however, is a low priority data device and if the data is not time sensitive, the mobile switch will store all of the inbound data from the public switched communications network and disconnect the call from the public switched communications network once the inbound data has been stored. To the inbound caller on the public switched communications network, the call appears to have been immediately connected and completed so that no further call requests for service for that particular inbound call are made by that inbound caller to the mobile switch. In fact, the data is stored in a buffer at the mobile switch or other central location, and a call request to the first remote user is generated at the mobile switch. If an idle channel is available, the first remote user is connected, and the data is delivered (forwarded) from the buffer to the first remote user. If no idle channel is immediately available, the call request for the first remote user is placed in the ordered queue, and the data is delivered (forwarded) from the buffer to the first remote user device when the first remote user moves to the head of the ordered queue and when an idle channel becomes available.

In another aspect of the present invention, multiple channel data service is provide by using a mixture of priorities. For example, a three channel data service could be provided for a remote user by assigning a high priority to one of the remote user's channels and a lower priority to the other two channels. This mixture of priority assignments allows the remote user to get high priority access just like a voice call at all times on the high priority channel. During off-peak times when idle channels are available for the lower priority data, the remote user could achieve throughput on all three channels at a rate of about three times the voice rate.

The system and method of the present invention allows an existing cellular, communications system or other switched communications network to set up calls based on the priority assigned to each remote user. A call to or from a lower priority remote user, such as a data call, is connected only after the higher priority calls, such as voice calls, are completed and idle channels become available. By prioritizing and using idle channels for lower priority calls, a service provider can rationally offer lower rates on the lower priority calls and at the same time increase the overall utilization of the cellular communications system.

DETAILED DESCRIPTION

One environment for the present invention is an existing cellular communications system. Such cellular communications systems include among others those constructed and operated in accordance with various well known standards, such a TDMA (IS-54 and IS-136), AMPS (IS-41), NAMPS, GSM, DCS1800, DCS1900, CDMA (IS-95), PACS, TACS, JTACS, and PDC. The present invention also has applicability to any other circuit switched communications network having a control switch and a controlled node access point with a limited number of channels at each node, such as digital loop carrier networks.

Figure 1:
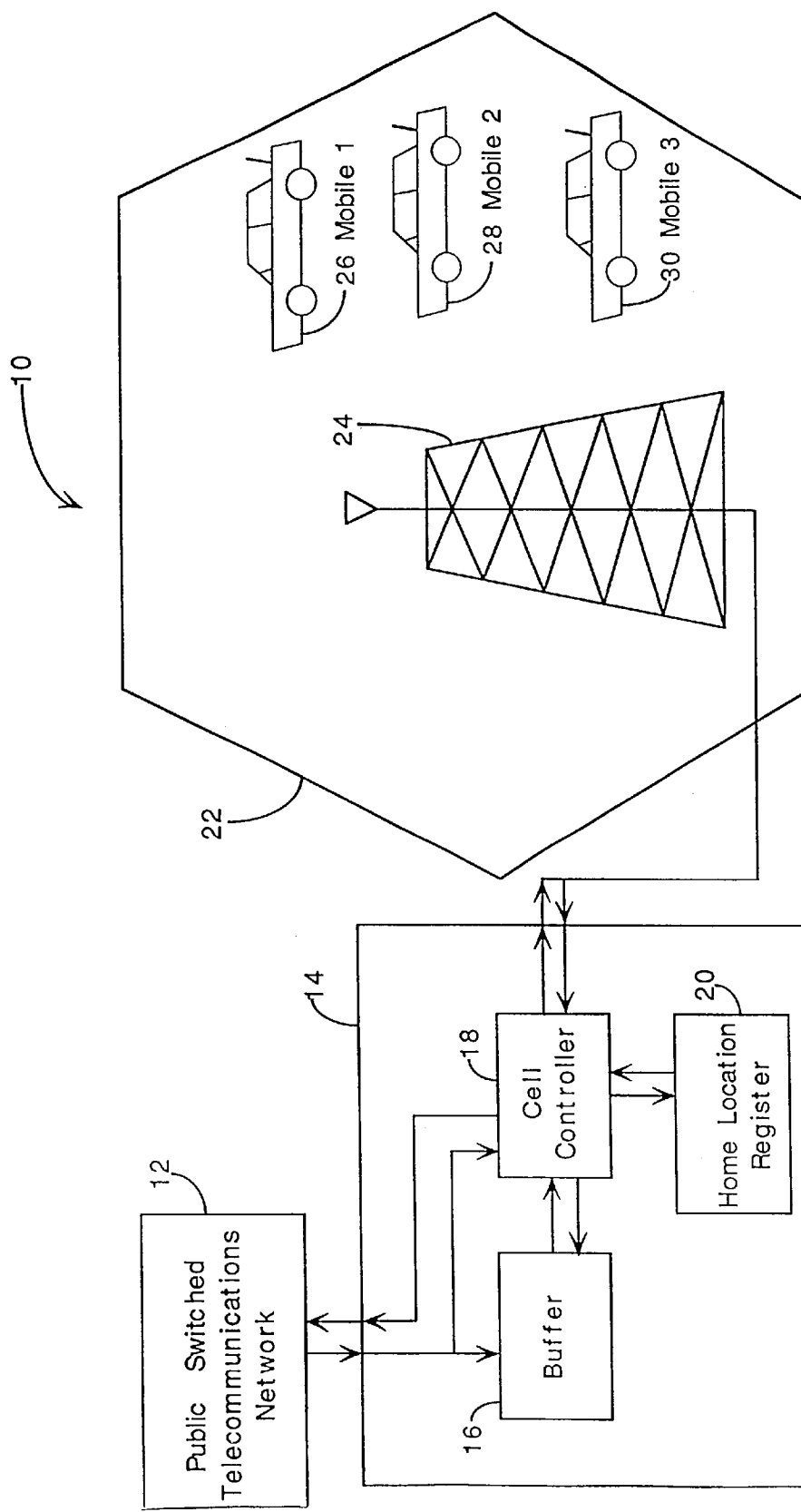
FIG. 1 is block diagram of a cellular communications system which is an environment for the present invention.

Turning to the drawings in which like numbers reference like parts or steps, in the several figures, FIG. 1 of this specification is a schematic diagram of a cellular communications system 10 which constitutes one environment for the present invention. The cellular communications system 10 comprises a mobile switch 14 and a number of cells, such as illustrated cell 22. The cellular communications system 10 is connected to the public switched telecommunications system 12 via the mobile switch 14.

Each cell, such as the cell 22, has a transmitter/receiver tower 24 which transmits data to and receives data from remote users 26 (mobile 1), 28 (mobile 2), and 30 (mobile 3). Each cell has a limited number of channels on which data can be transmitted and received. While each of the remote users 26, 28, and 30 are illustrated as an automobile based telephone user, the remote users may include a variety of devices, such as hand held telephones, facsimile machines, computers, telemetry devices, and control devices, among others.

The mobile switch 14 comprises a buffer 16, a cell controller 18, and a home location register (HLR) 20. The cell controller 18 is a high speed general purpose digital computer that is programmed to control the functions required of the mobile switch 14. The HLR 20 is a memory device capable of storing a database under control of the cell controller 18. The database in the HLR 20 includes the profile and authorization information including the priority for each of the remote users. The buffer 16 is a memory device under control of the cell controller 18 that is used to receive and store data for later delivery to a remote user in the cell in accordance with one aspect of the present invention. While the buffer 16 is illustrated as within the mobile switch 14, the buffer could be remotely located.

In the cellular communications system 10, voice call service requires immediate access to a channel and continuity of connection over the channel for the duration of the voice call. Voice call service will be considered unacceptable by remote users if a remote user cannot acquire a channel quickly and/or if voice calls are dropped during a conversation. By contrast, data call service does not require the same immediacy of access or continuity of connection. An e-mail message or a facsimile document may be delayed for several minutes or even hours without adversely effecting the usefulness of the data call service. Likewise transmission of an e-mail message or a facsimile document can be interrupted and then resumed without adversely effecting the service as long as the resumption can pick up the transmission at the point of interruption.

The present invention provides a system and method for taking advantage of the differing priorities required for satisfactory voice calls and data calls. In order to provide different priorities of service, each remote user device is assigned a priority based on the nature of use of that remote user device. Each user's priority assignment is associated with the user's mobile identification number (MIN). The MIN associated priorities of each user are stored in the HLR database 20 at the mobile switch 14. For example, the mobile telephones, which provide voice call service, are assigned the highest priority. On the other hand wireless facsimile machines and wireless e-mail systems are assigned a lower priority.

While the present invention will be described in connection with a two priority system, high priority for voice and low priority for data, the invention lends itself to multiple priorities. Each lower level of priority offers the opportunity for lower charges by the service provider to customers with low priority needs for transmission of data. Conversely, high priority service rationally brings with it the opportunity to charge more by the service provider.

In addition, a remote user device could be assigned multiple MINs each with a different priority or a mixture of priorities. Such multiple MIN devices could thus provide, for example, three channels of service, one channel of high priority service and two additional channels of lower priority data service. Such device would have high priority access for data transmission at all times and during off-peak times could use all three channels for enhanced speed data transmission using all three channels together.

Figure 2:
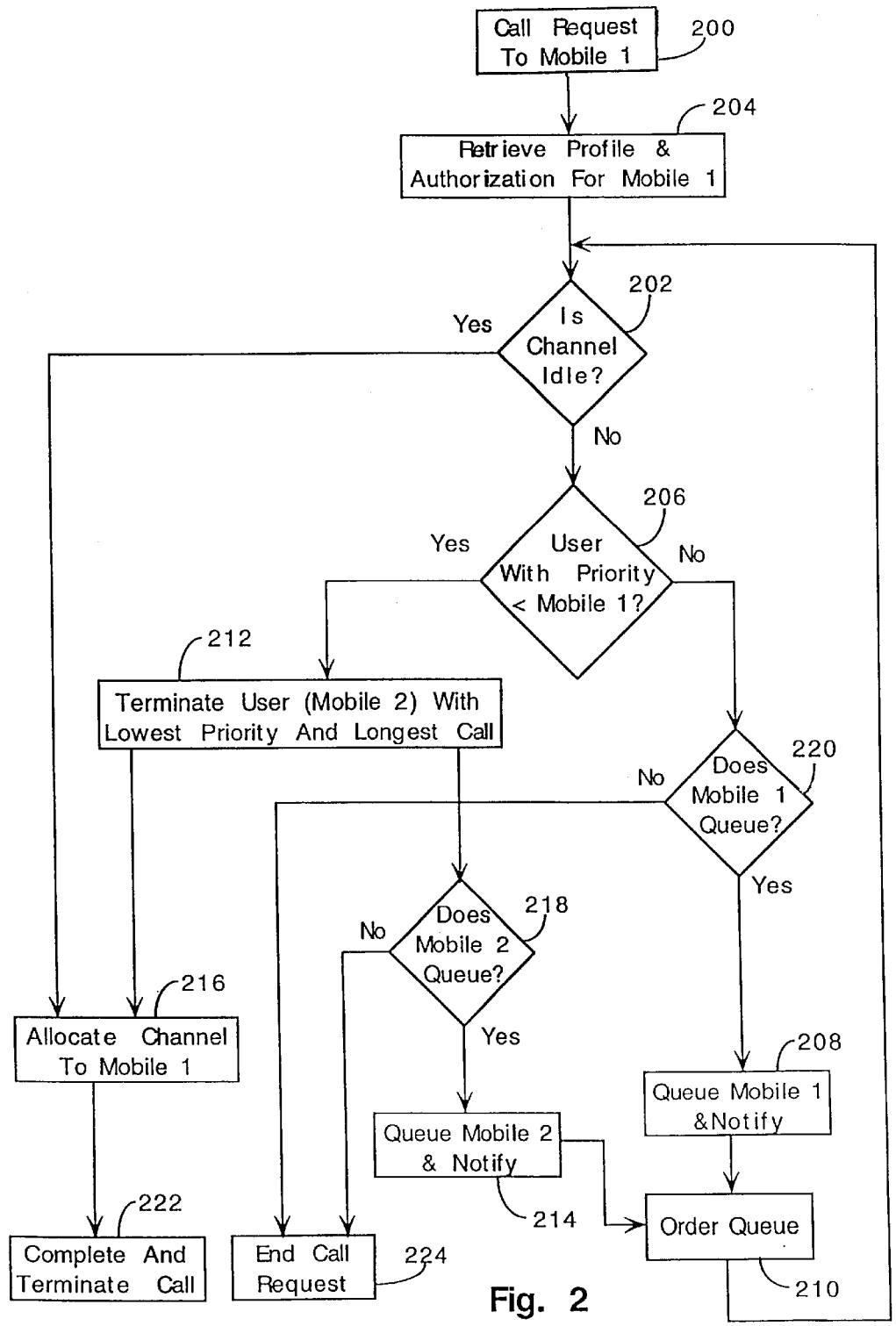
FIG. 2 is a flow diagram illustrating the method of handling requests for service from a remote user in accordance with the present invention.

Turning to FIG. 2, there is shown a flow diagram showing the method of the present invention when the remote user 26 (mobile 1) requests service from within the cell 22. The method of the present invention begins at step 200 with a request for service from mobile 1 in cell 22. The request for service is transmitted in conventional fashion to the mobile switch 14.

At step 204, the cell controller 18 queries the HLR database 20 to determine the priority of service for mobile 1 based on mobile 1's profile and authorization information. Mobile 1's profile and authorization information was provided to the mobile switch 14 when mobile 1 first registration with the service provider for the cellular communications system 10. After acquiring the profile and authorization information including the priority for mobile 1 from the HLR at step 204, the method proceeds to step 202.

At step 202, the cell controller 18 of the mobile switch 14 ascertains whether there is an idle channel available to service the request for service from mobile 1. If at step 202, the cell controller 18 of the mobile switch 14 determines that there is an idle channel in cell 22, the method follows the "yes" branch to step 216, and the idle channel is assigned to mobile 1 without regard to mobile 1's priority. When the call of mobile 1 is completed, the method proceeds to step 222 where the completed call is terminated for mobile 1.

If on the other hand there is not an idle channel available at step 202, the method follows the "no" branch from step 202 to step 206. At step 206, the method determines if there is a current remote user in cell 22 that has a priority lower than mobile 1's priority. If all the users have a priority equal to or higher than mobile 1's priority, the method follows the "no" branch to step 220.

At step 220, base on the profile and authorization information for mobile 1, the cell controller 18 determines whether mobile 1's call request should be queued for later connection. If mobile 1's profile and authorization information does not authorize queuing, the method follows the "no" branch to step 224 where mobile 1's call request is ended.

Mobile 1 may not want to queue its call request if, for example, Mobile 1 is a low priority voice service. Such a low priority voice caller expects to be precluded from the network from time to time, but such a voice caller probably does not want to wait in a queue of undermined length. Instead such a low priority voice caller may simple want to place the call later.

On the other hand, if mobile 1 is a low priority data service, such a data caller may want to queue his call for later service. If the cell controller 18 determines at step 220 that mobile 1 has registered with the service provider for queuing, the method then follows the "yes" branch to step 208. At step 208 the call request from mobile 1 is put into a queue to await the next available channel in cell 22. At step 208, the cell controller also notifies mobile 1 that its call request has been queued so that mobile 1 does not continue to send new call requests to the mobile switch 14. At step 210, the queue is ordered by priority and time of wait so that the call request with the highest priority and the longest waiting time is at the head of the queue and will be assigned the next available channel in cell 22. After ordering the queue at step 210, the method returns to step 202 to seek the next available channel in cell 22 for the call request for the remote user at the head of the queue.

If, however, at step 206, the cell controller 18 determines that a channel in cell 22 is being used by a remote user, such as mobile 2, with a priority lower than mobile 1, the method follows the "yes" branch to step 212. At step 212, the cell controller 18 terminates mobile 2's lower priority data call, and at step 216, the cell controller 18 allocates the vacated channel to mobile 1. Mobile 1's call is complete and terminated at step 222.

The selection of mobile 2 for call termination at step 212 is based on the priority of mobile 2 and on the duration of mobile 2's call at the time of termination. For example, if several current remote users have the same priority as mobile 2, which is priority is lower than mobile 1, the cell controller 18 will terminate the remote user that has been connected for the longest time. In this case mobile 2 is assumed to be the call with the longest duration of those users with the same priority as mobile 2. As part of the termination process of mobile 2, the software that controls the transmission of data to and from mobile 2 will recognize the termination and mark the point in the transmission where call termination occurred. On resumption of the call to mobile 2, the software will be able to pick up the data transfer at the point of termination.

After the call of mobile 2 has been terminated at step 212, the method proceeds to step 218 where, based on mobile 2's profile and authorization information, the cell controller 18 determines whether a request by mobile 2 for resumption of its call should be put in the queue. If mobile 2's profile and authorization information does not authorize queuing, the method follows the "no" branch from step 218 to step 224 where mobile 2's call request to resume is ended. Alternatively, the method follows the "yes" branch from step 218 to step 214 where the cell controller 18 puts a request to resume the terminated call of mobile 2 into the queue. At step 214, the cell controller 18 also notifies mobile 2 that its call has been queued so that mobile 2 will not try to reestablish its call by new call requests to the mobile switch 14. The queue is ordered at step 210 as previously described, and the ordered call requests in the queue wait for the next available channel in cell 22 as indicated by the return path to step 202.

If the terminated call for mobile 2 was transferring data to mobile 2 at the time of termination, the cell controller 18 may maintain the connection to the public switched telephone network 12 for resumption of data transfer when the call to mobile 2 is resumed on an idle channel. Alternatively, the cell controller 18 may store all of the data from the caller in buffer 16, terminate the call from the public switched telephone network 12, and transfer the data from the buffer 16 to mobile 2 upon reacquisition of an idle channel for mobile 2. Such storing and forwarding of data will be described in greater detail in connection FIG. 3. If on the other hand the terminated call of mobile 2 was transferring data from mobile 2 to a caller on the public switched telephone network 12, the cell controller 18 will maintain the connection to the public switched telephone network 12 until a channel for mobile 2 is reacquired and the transmission is complete.

Figure 3A:
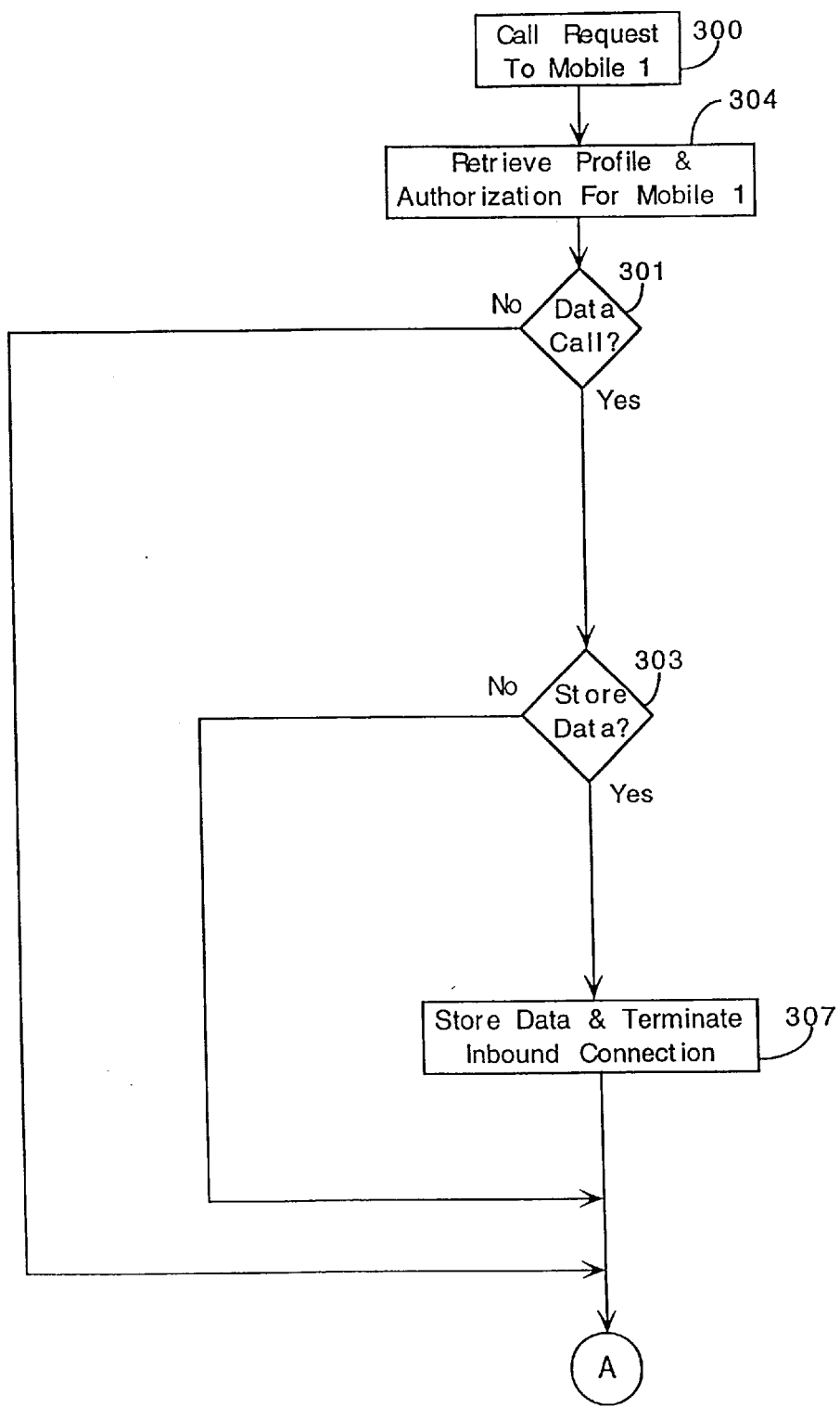
FIGS. 3A and 3B is a flow diagram illustrating the method of handling requests for service to a remote user for transmitting data to the remote user in accordance with the present invention.
Figure 3B:
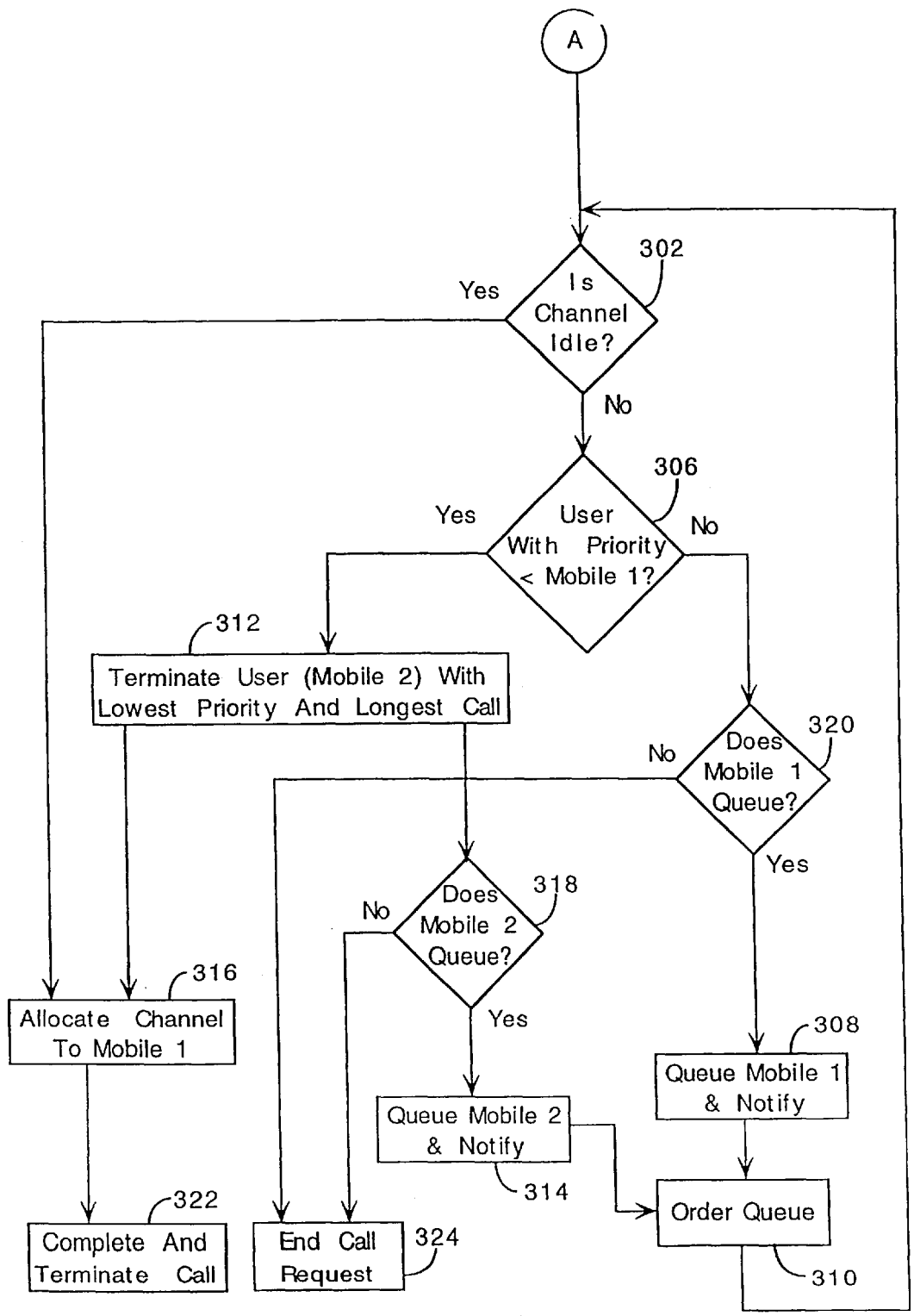

Turning to FIGS. 3A and 3B, there is shown a flow diagram showing the method of the present invention when a caller from the public switched telephone network 12 requests service to the remote user 26 (mobile 1) within the cell 22. The method of the present invention begins at step 300 with a request for service from the public switched telephone network 12 for a call to mobile 1 in cell 22. The request for service to mobile 1 is transmitted from the public switched telephone network 12 to the mobile switch 14. After receiving the call request at step 300, the method proceeds to step 304.

At step 304, the cell controller 18 queries the HLR database 20 to determine the priority of service for mobile 1 based on the profile and authorization information for mobile 1's MIN. Based on the priority of mobile 1, the cell controller 18 determines at step 301 whether the call is a data transfer call. If at step 301 the cell controller 18 determines that the call is not a data transfer call, the method follows the "no" branch to step 302 (FIG. 3B).

If at step 301 the cell controller 18 determines that the call is a data transfer call, the method follows the "yes" branch to step 303. At step 303, the cell controller 18 determines whether the data should be stored in the buffer 16. The decision to store or not to store data at step 303 is based on the cell controller's estimation of the length of wait before a connection can be made to mobile 1. If data is not stored, the method follows the "no" branch to step 302 (FIG. 3B) and retains the connection to the inbound caller on the public switched telecommunications network 12. If the data is stored at step 303, the method follows the "yes" branch to step 307.

At step 307, the inbound data from the public switched telephone network 12 is stored in buffer 16, and the connection from the public switch telephone network is terminated. The use of buffer 16 and step 307 is optional, and the mobile switch 14 could simply maintain the connection to the public switched telephone network until the data transmission to mobile 1 is complete. After the data is stored in buffer 16 at step 307, the method proceeds to step 302 (FIG. 3B).

At step 302, the cell controller 18 of the mobile switch 14 ascertains whether there is an idle channel available for servicing the call request to mobile 1. If there is an idle channel in cell 22, the method follows the "yes" branch to step 316, and the idle channel is allocated to mobile 1 without regard to the priority of mobile 1. Once the call to mobile 1 has been completed, the method proceeds to step 322 where the call to mobile 1 is terminated and the data for mobile 1 is emptied (marked to be overwritten) from the buffer.

If there is no idle channel available, the method follows the "no" branch to step 306. At step 306, the method determines if there is a current remote user in cell 22 that has a priority lower than mobile 1's priority. If all the users have a priority equal to or higher than mobile 1's priority, the method follows the "no" branch to step 320. At step 320, the cell controller determines from mobile 1's profile and authorization information and from the handling of the inbound data whether the call request to mobile 1 should be queued. If the inbound data was not stored at step 307 (FIG. 3A), then the call request to mobile 1 may not queued, and the method follows the "no" branch to step to step 324 where the inbound call request is ended, and the inbound caller is notified that no connection was made to mobile 1. If the inbound data was stored at step 307 (FIG. 3A), then the call request to mobile 1 will be placed in an order queue by the cell controller 18, and the method will follow the "yes" branch to step 308.

At step 308 the call request to mobile 1 is put into the ordered queue, mobile 1 is notified that it has an inbound queued call request awaiting the next available channel in cell 22. At step 310 the queue is ordered by priority and time of wait so that the call request with the highest priority and the longest waiting time is moved to the head of the queue for assignment to the next available channel in cell 22. After ordering the queue at step 310, the method returns to step 302 to seek the next available channel in cell 22 for the call request at the head of the ordered queue.

If, however, at step 306, the cell controller 18 determines that a channel in cell 22 is being used by a remote user, such as mobile 2, with a priority lower than mobile 1, the method follows the "yes" branch to step 312. At step 312, the cell controller 18 terminates mobile 2's lower priority data call, and at step 316 allocates the vacated channel to mobile 1. The selection of mobile 2 for call termination is based on the priority of mobile 2 and on the duration of mobile 2's call at the time of termination. As part of the termination process for mobile 2, the software that controls the transmission of data to and from mobile 2 will recognize the termination and mark the point in the transmission where call termination occurred. On resumption of the call to mobile 2, the software will pick up the data transfer at the point of termination.

After the call of mobile 2 has been terminated at step 312, the method proceeds to step 318 where the cell controller 18 determines whether mobile 2's request to resume its connection should be queue or ended. If the call request to resume is to be ended, the method follows the "no" branch to step 324 where the cell controller 18 ends the request of mobile 2 to resume its terminated call. Alternatively, the method follows the "yes" branch from step 318 to step 314 where the cell controller 18 puts mobile 2's request to resume its terminated call into the ordered queue and notifies mobile 2 that its request to resume has been queued. The queue is ordered at step 310, and the call requests in the queue wait for the next available channel in cell 22 for the call request at the head of the ordered queue as indicated by the return path to step 302.

Based on the foregoing it should also be appreciated that the present invention also contemplates multiple priorities for multiple levels of service. For example, voice callers could be given multiple levels to distinguish emergency services from other voice calls. On a lower priority level data transmissions could be further subdivided, for example, to provide a higher priority for facsimile transmission than for e-mail. Further e-mail could be further subdivided to provide higher and lower levels of priority service. Each priority could be offered a separate rate. The ordering of the queue in the mobile switch 14 assures that the various requests for service for each device is serviced in the proper priority order as idle channels become available.

While the present invention has been described in connection with a cellular communications system, the invention is equally applicable to any switched communications system having a switch for controlling access to a network access node with a limited number of access channels for serving remote users. Digital loop carriers is another example of such a switched communications system environment in which the present invention finds applicability.

What is claimed is:

1. In a communications system having a switch, remote users, a network access node, and a limited number of channels per network access node, a method for transmitting data using idle channels, comprising:

assigning a priority to at least one remote user;

receiving a request for service at the switch for a first remote user;

ascertaining if any channel at the access node of the first remote user is idle; and if a channel is not idle, searching for a second remote user with a priority lower than the first remote user among the remote users that are using the channels of the access node;

if a second remote user with a priority lower than the first remote user is not found, then placing the request for service for the first remote user in a queue and notifying the first remote user that the request for service has been placed in a queue.

2. The method of claim 1, wherein assigning a priority to at least one remote user comprises associating at least one mobile identification number with the remote user.

3. The method of claim 1, assigning a priority to at least one remote user comprises associating a priority with the remote user depending on the remote user's usage of a communications device.

4. The method of claim 3, wherein the communications device is selected from a group consisting of: facsimile, electronic mail, computer, handheld telephone, wireless communications device, messaging device, communications device, telemetry device, and control device.

5. The method of claim 1, wherein the queue is ordered by a priority assigned to the remote user and a call waiting time.

6. The method of claim 1, wherein the queue is ordered so that a request for service with a relatively higher priority assigned to a remote user and longer call waiting time is assigned an available channel sooner than another call request with a relatively lower priority assigned to a remote user and shorter call waiting time.

7. The method of claim 1, wherein notifying the first remote user that the request for service has been placed in a queue comprises:

sending a status message to the first remote user.

8. The method of claim 7, wherein the status message includes information selected from a group consisting of: queue number, queue priority, number of requests in a particular queue, current placement of the request in a particular queue, time of day, expected delay, redirection regarding better frequency, service level, type of service, a recommended service level to avoid subsequent queuing, pricing information, pricing to expedite the call request, recommended re-try time, an alternative service provider, and other associated network information.

9. In a communications system having a switch, remote users, a network access node, and a limited number of channels per network access node, a method for transmitting data using idle channels comprising:

assigning a priority to each remote user;

receiving a request for service at the switch for a first remote user;

ascertaining if any channel at the access node of the first remote user is idle; and if a channel is not idle, searching for a second remote user with a priority lower than the first remote user among the remote users that are using the channels of the access node;

if a second remote user with a priority lower than the first remote user is found, then notifying the second remote user of a pending call termination, terminating the call of the second remote user, and allocating the channel of the second remote user to the first remote user.

10. The method of claim 9, wherein notifying the second remote user of a pending call termination, comprises:

sending a status message to the second remote user.

11. The method of claim 10, wherein the status message includes information selected from a group consisting of: time of day, expected delay, service level, type of service, a recommended service level to avoid termination, pricing information to avoid termination, recommended re-try time, an alternative service provider, and other associated network information.

12. The method of claim 9, wherein notifying the second remote user of a pending call termination, comprises sending the second remote user a call termination message.

13. The method of claim 12, wherein the call termination message includes information selected from a group consisting of: time of day, expected delay, service level, type of service, a recommended service level to avoid subsequent termination, pricing information to avoid subsequent termination, recommended re-try time, an alternative service provider, and other associated network information.

14. The method of claim 6, further comprising:

designating a point in the call of the second remote user where call termination occurred, and upon resumption of the call of the second remote user, returning to the designated point in the call of the second remote user where call termination occurred.

15. In a communications system having a switch, remote users, a network access node, and a limited number of channels per network access node, a method for transmitting data using idle channels, comprising:

assigning a priority to each remote user, wherein the priority for each user is based upon at least one application that each user is performing;

receiving a request for service at the switch for a first remote user;

ascertaining if any channel at the access node of the first remote user is idle; and if a channel is not idle, searching for a second remote user with a priority lower than the first remote user among the remote users that are using the channels of the access node;

if a second remote user with a priority lower than the first remote user is found, then terminating the call of the second remote user and allocating the channel of the second remote user to the first remote user.

16. The method of claim 15, wherein an application is selected from a group consisting of: voice transmission, electronic mail transmission, facsimile transmission, data transmission, communication transmission, a messaging application, a computer-associated application, a telemetry-associated application, and a control-associated application.

17. The method of claim 15, wherein the at least one application comprises a plurality of associated applications, wherein each associated application has a predefined priority.

18. The method of claim 15, wherein the plurality of associated applications is prioritized so that an associated application with a relatively higher priority is assigned an available channel sooner than another associated application with a relatively lower priority.

19. The method of claim 17, wherein the application comprises electronic mail, and the plurality of associated applications comprises bulk electronic mail, standard electronic mail, and priority electronic mail.

20. The method of claim 15, further comprising:
if a second remote user with a priority lower than the first remote user is not found, then placing the request for service for the first remote user in a queue and notifying the first remote user that the request for service has been placed in a queue.

21. The method of claim 20, wherein the queue is ordered by a priority assigned to the remote user and a call waiting time.

22. The method of claim 20, wherein the queue is ordered so that a request for service with a relatively higher priority assigned to a remote user and longer call waiting time is assigned an available channel sooner than another call request with a relatively lower priority assigned to a remote user and shorter call waiting time.

23. The method of claim 20, wherein notifying the first remote user that the request for service has been placed in a queue comprises:
sending a status message to the first remote user.

24. The method of claim 23, wherein the status message includes information selected from a group consisting of: queue number, queue priority, number of requests in a particular queue, current placement of the request in a particular queue, time of day, expected delay, redirection regarding better frequency, service level, service type, pricing, recommended re-try time, an alternative service provider, and other associated network information.

25. In a communications system having a switch, remote users, a network access node, and a limited number of channels per network access node, a method for transmitting data using idle channels comprising:
assigning a priority to each remote user, wherein the priority for each user is based upon at least one application that each user is performing, wherein at least one application comprises a plurality of associated applications, each associated application having a predefined priority, and wherein the priority for each user is further based upon at least one associated application that each user is performing;
receiving a request for service at the switch for a first remote user;
ascertaining if any channel at the access node of the first remote user is idle; and
if a channel is not idle, searching for a second remote user with a priority lower than the first remote user among the remote users that are using the channels of the access node;
if a second remote user with a priority lower than the first remote user is found, then terminating the call of the second remote user and allocating the channel of the second remote user to the first remote user.

26. The method of claim 25, wherein the predefined priority for each associated application is based upon information selected from a group consisting of: a type of application, a type of associated application, a predefined class of service, a predefined quality of service, a service requirement, a predefined identifying code, a personal identification number, a mobile identification number, and a bandwidth requirement of the associated application.

27. The method of claim 25, further comprising:
if a second remote user with a priority lower than the first remote user is not found, then placing the request for service for the first remote user in a queue and notifying the first remote user that the request for service has been placed in a queue.

28. The method of claim 27, wherein the queue is ordered by a priority assigned to the remote user and a call waiting time.

29. The method of claim 27, wherein the queue is ordered so that a request for service with a relatively higher priority assigned to a remote user and longer call waiting time is assigned an available channel sooner than another call request with a relatively lower priority assigned to a remote user and shorter call waiting time.

30. The method of claim 27, wherein notifying the first remote user that the request for service has been placed in a queue comprises:
sending a status message to the first remote user.

31. The method of claim 30, wherein the status message includes information selected from a group consisting of: queue number, queue priority, number of requests in a particular queue, current placement of the request in a particular queue, time of day, expected delay, redirection regarding better frequency, service level, service type, pricing, recommended re-try time, an alternative service provider, and other associated network information.

32. In a communications system having a switch, at least one remote user, a network access node, and a limited number of channels per network access node, a method for transmitting voice communications using idle channels, comprising:
assigning a priority to each remote user, wherein an emergency priority is assigned to each remote user identified as an emergency remote user;
receiving a request for service at the switch for an emergency remote user;
ascertaining if any channel at the access node of the emergency remote user is idle; and
if a channel is not idle, searching for a remote user without an emergency priority among the remote users that are using the channels of the access node;
if a remote user without an emergency priority is found, then terminating the call of the remote user without an emergency priority and allocating the channel of the remote user without an emergency priority to the emergency remote user.

33. The method of claim 32, wherein the emergency priority is assigned based upon information selected from a group consisting of: an originating directory number, a terminating directory number, a personal identification number, a mobile identification number, and an application performed by the user.

34. The method of claim 32, wherein the emergency remote user places a call to an emergency directory number.

35. The method of claim 32, wherein terminating the call of the remote user without an emergency priority and allocating the channel of the remote user without emergency priority to the emergency remote user, comprises:
notifying the remote user without an emergency priority that the call has been terminated; and
placing a request for the remote user without an emergency priority in a queue.

36. The method of claim 35, wherein the queue is ordered by a priority assigned to the remote user and a call waiting time.

37. The method of claim 35, wherein the queue is ordered so that a request for service with a relatively higher priority assigned to a remote user and longer call waiting time is assigned an available channel sooner than another call request with a relatively lower priority assigned to a remote user and shorter call waiting time.

38. The method of claim 35, wherein notifying the remote user without an emergency priority that the call has been terminated comprises:

sending a status message to the remote user without an emergency priority.

39. The method of claim 38, wherein the status message includes information selected from a group consisting of: queue number, queue priority, number of requests in a particular queue, current placement of the request in a particular queue, time of day, expected delay, redirection regarding better frequency, service level, service type, pricing, recommended re-try time, an alternative service provider, and other associated network information.

40. A communications system having a switch, remote users, a network access node, and a limited number of channels per network access node, the system comprising:

a memory containing a database in which a priority for each remote user is recorded; and a node controller operatively connected to the memory and adapted to control the functions of the switch, wherein the node controller assigns a priority to at least one remote user;

receives a request for service at the switch for a first remote user;

ascertains if any channel at the access node of the first remote user is idle; and if a channel is not idle, searches for a second remote user with a priority lower than the first remote user among the remote users that are using the channels of the access node;

if a second remote user with a priority lower than the first remote user is not found, then places the request for service for the first remote user in a queue and notifies the first remote user that the request for service has been placed in a queue.

41. A communications system having a switch, remote users, a network access node, and a limited number of channels per network access node, the system comprising:

a memory containing a database in which a priority for each remote user is recorded; and a node controller operatively connected to the memory and adapted to control the functions of the switch, wherein the node controller assigns a priority to each remote user;

receives a request for service at the switch for a first remote user;

ascertains if any channel at the access node of the first remote user is idle; and if a channel is not idle, searches for a second remote user with a priority lower than the first remote user among the remote users that are using the channels of the access node;

if a second remote user with a priority lower than the first remote user is found, then notifies the second remote user of a pending call termination, terminates the call of the second remote user, and allocates the channel of the second remote user to the first remote user.

42. A communications system having a switch, remote users, a network access node, and a limited number of channels per network access node, the system comprising:

a memory containing a database in which a priority for each remote user is recorded; and a node controller operatively connected to the memory and adapted to control the functions of the switch, wherein the node controller assigns a priority to each remote user, wherein the priority for each user is assigned based upon one or more of a plurality of applications that each user is performing;

receives a request for service at the switch for a first remote user;

ascertains if any channel at the access node of the first remote user is idle; and if a channel is not idle, searches for a second remote user with a priority lower than the first remote user among the remote users that are using the channels of the access node;

if a second remote user with a priority lower than the first remote user is found, then terminates the call of the second remote user and allocates the channel of the second remote user to the first remote user.

43. In a communications system having a switch, remote users, a network access node, and a limited number of channels per network access node, the system comprising:

a memory containing a database in which a priority for each remote user is recorded; and a node controller operatively connected to the memory and adapted to control the functions of the switch, wherein the node controller assigns a priority to each remote user, wherein the priority for each user is assigned based upon at least one application that each user is performing, wherein at least one application comprises a plurality of associated applications, each associated application having a predefined priority;

receives a request for service at the switch for a first remote user;

ascertains if any channel at the access node of the first remote user is idle; and if a channel is not idle, searches for a second remote user with a priority lower than the first remote user among the remote users that are using the channels of the access node;

if a second remote user with a priority lower than the first remote user is found, then terminates the call of the second remote user and allocates the channel of the second remote user to the first remote user.

44. A communications system having a switch, at least one remote user, a network access node, and a limited number of channels per network access node, the system comprising:

a memory containing a database in which a priority for each remote user is recorded; and a node controller operatively connected to the memory and adapted to control the functions of the switch, wherein the node controller assigns a priority to each remote user, wherein an emergency priority is assigned to each remote user identified as an emergency remote user;

receives a request for service at the switch for an emergency remote user;

ascertains if any channel at the access node of the emergency remote user is idle; and if a channel is not idle, searches for a remote user without an emergency priority among the remote users that are using the channels of the access node;

if a remote user without an emergency priority is found, then terminates the call of the remote user without an emergency priority and allocates the channel of the remote user without an emergency priority to the emergency remote user.

* * * * *